United States Patent
Alshehri et al.

(10) Patent No.: US 9,334,176 B1
(45) Date of Patent: May 10, 2016

(54) METHOD FOR REMOVING ORGANIC DYE FROM WASTEWATER

(71) Applicant: KING SAUD UNIVERSITY, Riyadh (SA)

(72) Inventors: Saad M. Alshehri, Riyadh (SA); Tansir Ahamad, Riyadh (SA); Mu Naushad, Riyadh (SA); Zeid A. Al-Othman, Riyadh (SA); Ali Aldalbahi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/637,366

(22) Filed: Mar. 3, 2015

(51) Int. Cl.
| | |
|---|---|
| C02F 1/28 | (2006.01) |
| C02F 1/48 | (2006.01) |
| B01J 20/30 | (2006.01) |
| B01J 20/32 | (2006.01) |
| B01J 20/28 | (2006.01) |
| B01J 20/26 | (2006.01) |
| B01J 20/06 | (2006.01) |
| C02F 101/30 | (2006.01) |

(52) U.S. Cl.
CPC .......... *C02F 1/285* (2013.01); *B01J 20/06* (2013.01); *B01J 20/26* (2013.01); *B01J 20/28009* (2013.01); *B01J 20/28019* (2013.01); *B01J 20/3071* (2013.01); *B01J 20/3278* (2013.01); *C02F 1/288* (2013.01); *C02F 1/488* (2013.01); *C02F 2101/308* (2013.01)

(58) Field of Classification Search
CPC .......... C02F 1/285; C02F 1/288; C02F 1/488; C02F 2101/38; B01J 20/3071; B01J 20/3278
See application file for complete search history.

(56) References Cited

U.S. PATENT DOCUMENTS

| | | | |
|---|---|---|---|
| 8,221,622 B2 * | 7/2012 | Fukaya et al. | 210/222 |
| 2011/0201076 A1 | 8/2011 | Liang | |
| 2013/0105397 A1 * | 5/2013 | Shukla et al. | 252/62.59 |

FOREIGN PATENT DOCUMENTS

CN 103304753 9/2013

OTHER PUBLICATIONS

Jianming Zhao et al., "Facile surfactant-free synthesis and characterization of $Fe_3O_4$@3-aminophenol-formaldehyde core-shell magnetic microspheres", J. Mater. Chem. A, advance article, published online Aug. 29, 2014.

* cited by examiner

*Primary Examiner* — David A Reifsnyder
(74) *Attorney, Agent, or Firm* — Richard C. Litman (57) ABSTRACT

The method for removing organic dyes from wastewater includes: (i) placing a magnetic polymer microsphere into contact with wastewater contaminated with organic dyes; (ii) permitting the organic dyes to adsorb onto the magnetic polymer microsphere; and removing the magnetic polymer microsphere using an external magnetic field applied by a magnet. The magnetic polymer microsphere has a ferromagnetic core surrounded by an adsorbent polymer.

9 Claims, 8 Drawing Sheets

Organic Surface Coating $Fe_3O_4$

Pre-polymer →

Microsphere

METHOD FOR REMOVING ORGANIC DYE FROM WASTEWATER

BACKGROUND OF THE INVENTION

1. Field of the Invention

The present invention relates to a process for the removal of organic or inorganic pollutants from water, and particularly to a method for removing organic dyes from wastewater by using magnetic polymer microspheres.

2. Description of the Related Art

Water pollution is the introduction of physical, chemical and biological substances into bodies of water that spoils the purity of water, which ultimately causes hazardous effects on living species, including those that consume the water. Water pollution is a very persistent problem, and the intensive disposal of different toxic substances without control constitutes a real danger. Wastewater from the manufacture of textiles, cosmetics, printing, dyeing, food coloring, paper making, etc., is often polluted by dyes. It has been estimated that about 1-15% of dyes are lost during the dyeing process in the textile industry and are eventually released as wastewater. These colored effluents pollute both surface water and the ground water system. Many dyes and pigments are toxic carcinogens and produce mutagenic effects. Organic dyes, such as Congo red, methyl blue, methylene blue, malachite green, rhodamine B, bromophenol blue. and rose Bengal dyes, are toxic and may cause cancer and other health side effects for both humans and aquatic life.

Dyes, when discharged into receiving streams, will generally cause detrimental effects on the liver, gill, kidney, intestine, gonads and pituitary gonadotrophic cells of aquatic life. In humans, they may cause irritation to the respiratory tract if inhaled, and irritation to the gastrointestinal tract if ingested. Contact of the dyes with skin and eyes may cause irritation with redness and permanent injury in other cases. The toxicity of Congo Red, Malachite Green, Rhodamine B, bromophenol blue, and Rose Bengal dyes to humans includes carcinogenicity, reproductive and developmental toxicity, neurotoxicity, and acute toxicity.

Alternatives have been contemplated for decontaminating waters, such as extraction with solvents, reverse osmosis, absorption on zeolites and absorption on activated carbon. As dyes in wastewater cannot be efficiently decolorized by traditional methods, the adsorption of synthetic dyes on inexpensive and efficient solid supports was considered as a simple and economical method for their removal from water and wastewater. The adsorption characteristics of a wide variety of inorganic and organic supports and size, such as micro- or nano-adsorbents, have been measured, and their capacity to remove synthetic dyes has been evaluated. Recently, various nano-adsorbents composed of polymers, inorganic materials or carbon have been developed for separating these stable, recalcitrant, colorant, and potentially carcinogenic dyes. Despite achieving efficiency in removing organic dyes, these nano-adsorbents have been found to be greatly limited in scope because these materials for treating wastewater require an additional separation step to remove the adsorbent from the solution.

Thus, a method for removing organic dye from wastewater solving the aforementioned problems is desired.

SUMMARY OF THE INVENTION

The method for removing organic dye from wastewater is an adsorptive method for removing organic pollutants from water. The method includes: (i) placing magnetic polymer microspheres into contact with wastewater contaminated with organic dyes; (ii) permitting the magnetic polymer microspheres to adsorb the organic dyes; and (iii) removing the magnetic polymer microspheres from the wastewater using an external magnetic field created by a local magnet. The partially purified wastewater may then be disposed of in the usual manner for removal of other contaminants and pollutants by wastewater treatment facilities. The magnetic polymer microspheres comprise a magnetic nanoparticle core surrounded by a polymeric resin.

The magnetic polymer microspheres are prepared by a method comprising: dispersing magnetic nanoparticles in an organic solvent; adding a polymeric resin while mechanically stirring the solvent; adjusting the pH of the solvent to about 4.0; filtering the solvent to isolate the magnetic polymer microspheres; and washing the magnetic polymer microspheres with water. The polymer resin is a mixture of p-aminophenol and formaldehyde.

These and other features of the present invention will become readily apparent upon further review of the following specification and drawings.

DETAILED DESCRIPTION OF THE PREFERRED EMBODIMENTS

The method of removing organic dyes from wastewater uses a magnetic ($Fe_3O_4$) ferrite polymeric core-shell nano-adsorbent to adsorb organic dyes in the wastewater. The microspheres (with the dyes adsorbed thereto) may then be removed from the wastewater using a magnetic field, either from a natural magnet or an electromagnet. The magnetic polymer microsphere was prepared by reacting a pre-polymer, which is prepared by the reaction of p-aminophenol and formaldehyde in the presence of triethylamine (basic medium), with ferrites as a core material to produce the magnetic polymer microsphere. The following examples will further illustrate the method.

Example 1

Production of Magnetite ($Fe_3O_4$)

Magnetite ($Fe_3O_4$) was prepared using an aqueous solution of iron ions with a 1:2 molar ratio of Fe (II) to Fe (III). Initially, 5.46 g of $FeCl_3 \cdot 6H_2O$ and 2.00 g of $FeCl_2 \cdot 4H2O$ were dissolved in 50 ml of water. Then, 0.6 PEG-2000 (polyethylene glycol) in 60 ml of aqueous acid (50 ml distilled water with 5 ml of 1 M HCl) was added drop-wise into 100 ml of 1 M $NH_4OH$ with 1.0 g PEG-2000 solution under vigorous stirring at 60° C. The reaction was carried out in an inert atmosphere by purging the reactor with high purity argon (99.9%). After all of the iron ion solution was added, the mixture was stirred for a further two hours. Then the colloidal solution was washed by distilled water several times until it was neutral. Some part of the colloid was dried in a refrigerator. The remnant of the colloid was dispersed in distilled water by ultra-sonication, and then it was ready for the polymer coating process.

Example 2

Production of Pre-Polymer Resin

Figure 2:
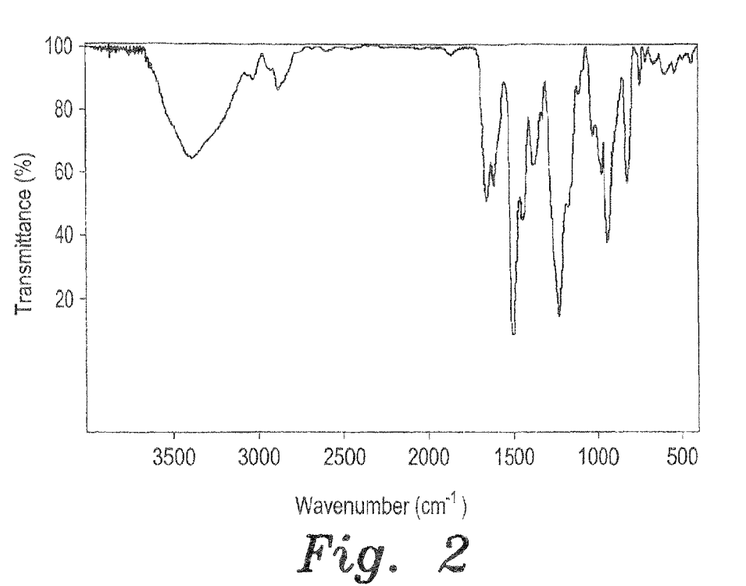
FIG. 2 is the FUR spectrum of the pre-polymer p-aminophenol-formaldehyde resin used in the synthesis of magnetic polymer microspheres used in a method for removing organic dye from wastewater according to the present invention.

In a 250 ml round-bottom flask, 4-aminophenol (5.46 g, 0.05 mol) was dissolved in 50 ml ethanol, followed by the addition of 37% aqueous formaldehyde (10 ml, 0.25 mol). The pH of the reaction mixture was adjusted to about 8.0 using an alcoholic solution of triethylamine ($Et_3N$). The mixture was heated to reflux with continuous stirring at 80° C. for five hours, and the volume was increased up to 150 ml using distilled water. The resulting brown solution was used as a pre-polymer resin for subsequent encapsulation of the ferrite spheres ($Fe_3O_4$). The FTIR of the resulting pre-polymer is displayed in FIG. 2.

Example 3

Production of Magnetic Polymer Microsphere

Figure 1A:
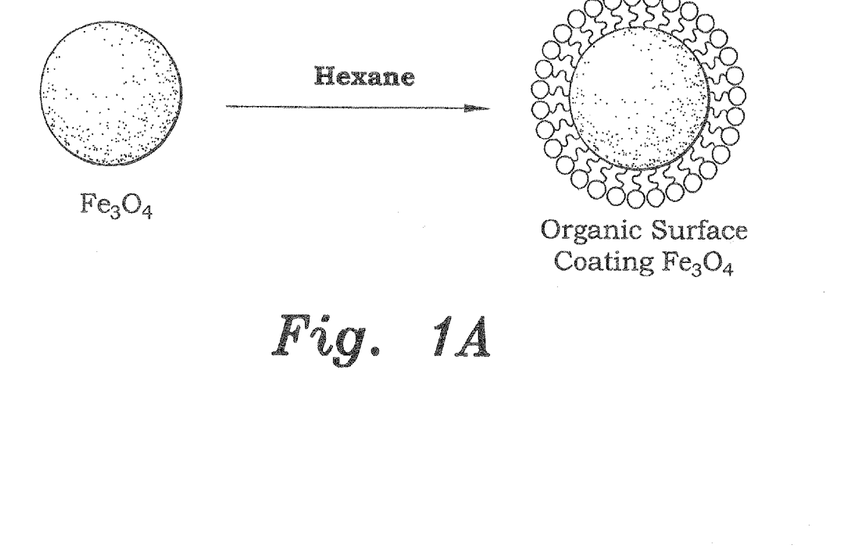
FIG. 1A is a diagrammatic reaction scheme showing the first step in the synthesis of magnetic polymer microspheres used in a method for removing organic dye from wastewater according to the present invention.
Figure 1B:
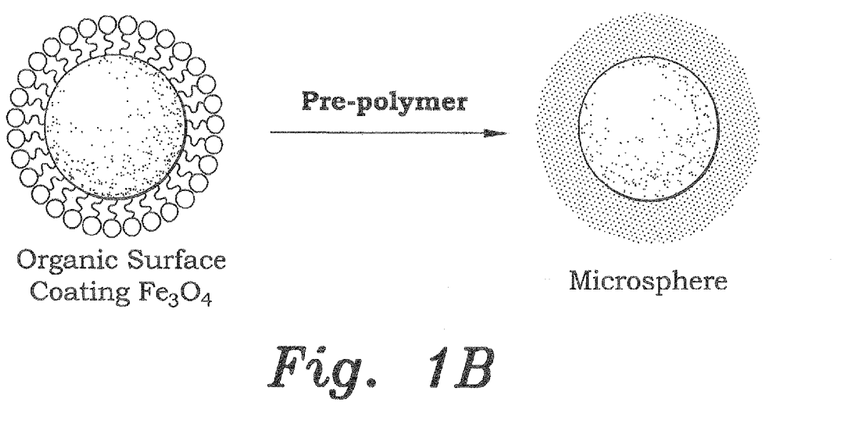
FIG. 1B is a diagrammatic reaction scheme showing the second step in the synthesis of magnetic polymer microspheres used in a method for removing organic dye from wastewater according to the present invention.
Figure 3:
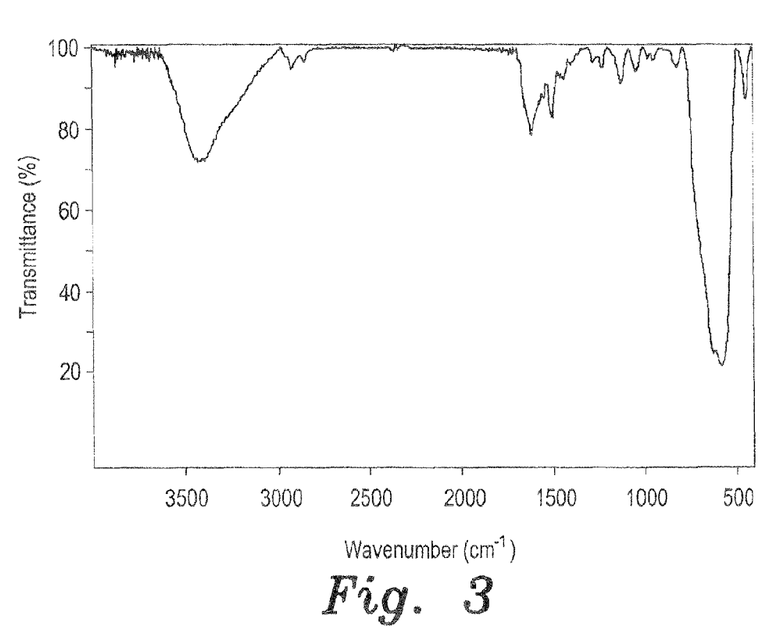
FIG. 3 is the FTIR spectrum of magnetic polymer microspheres used in a method for removing organic dye from wastewater according to the present invention.
Figure 4:
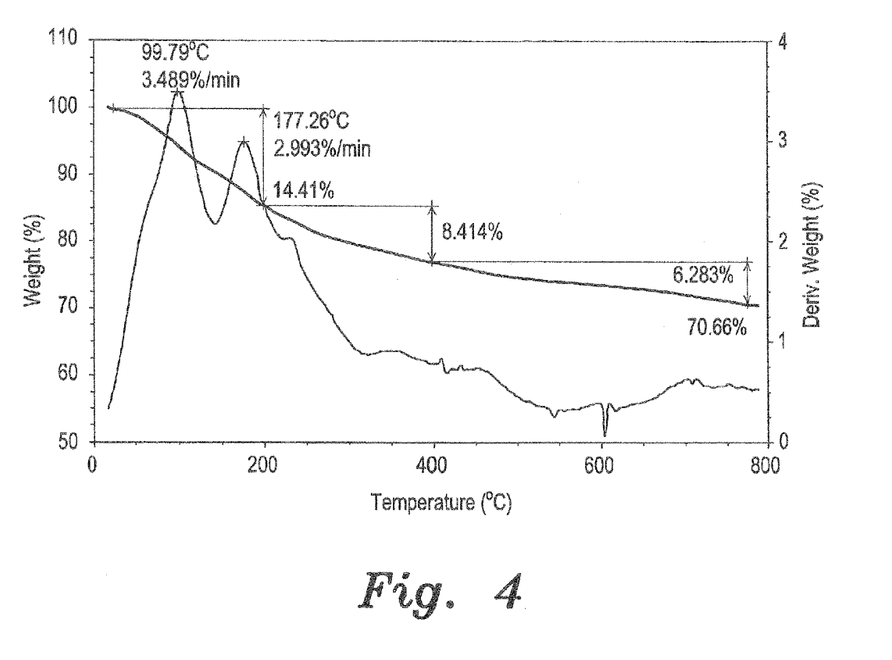
FIG. 4 is a thermogravimetric analysis (TGA) curve of magnetic polymer microspheres used in a method for removing organic dye from wastewater according to the present invention.
Figure 5:
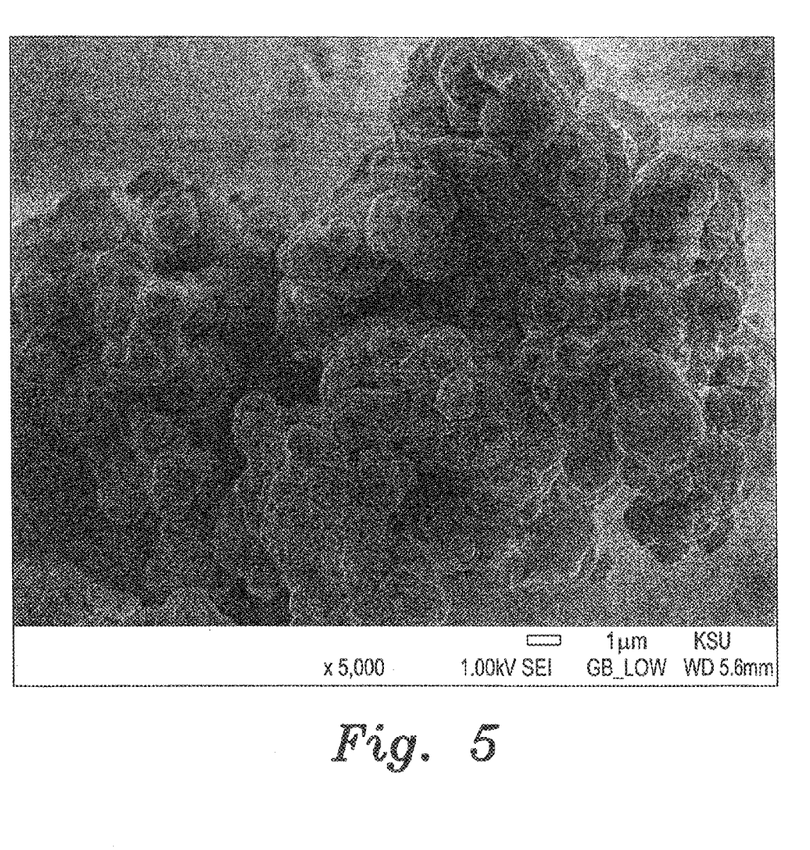
FIG. 5 shows an exemplary SEM (scanning electron micrograph) of magnetic polymer microspheres used in a method for removing organic dye from wastewater according to the present invention.
Figure 8:
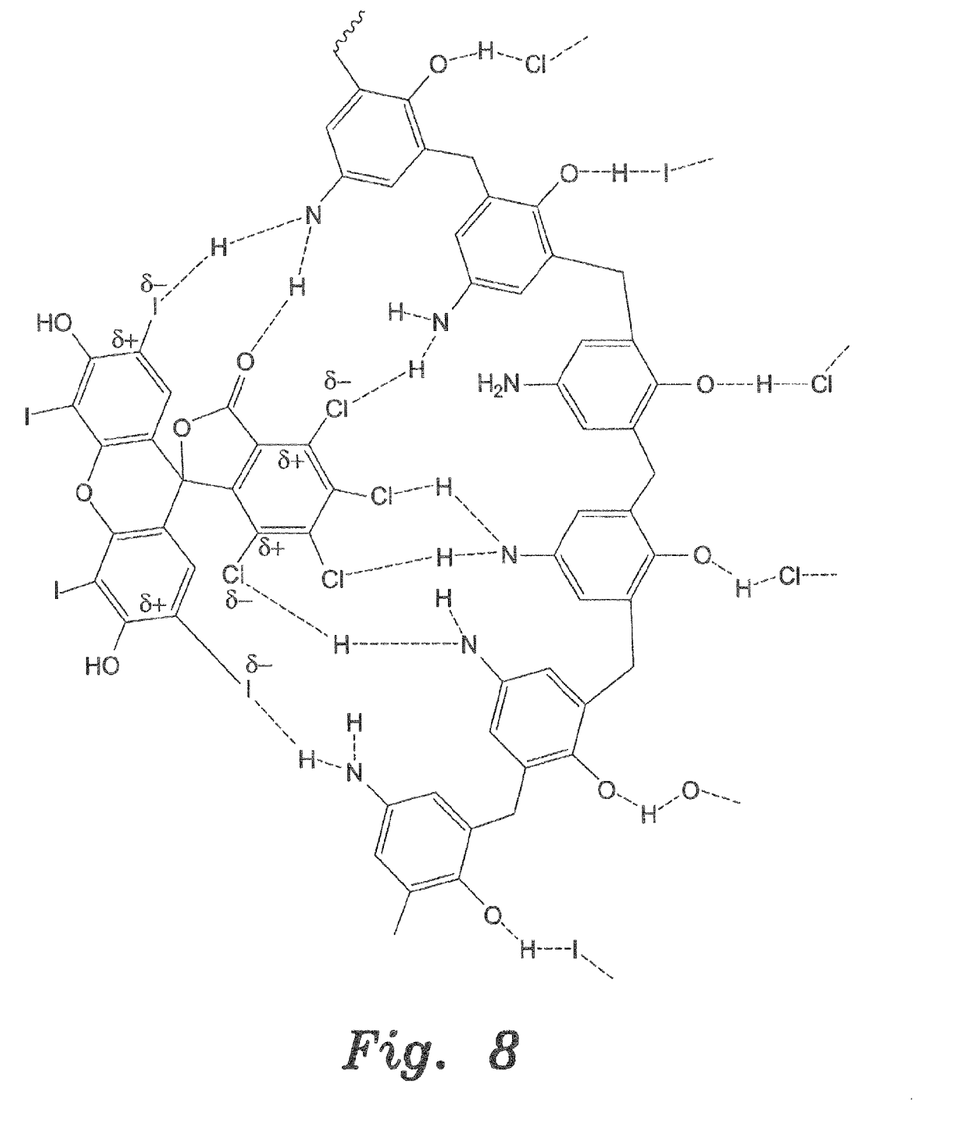
FIG. 8 is a schematic drawing of proposed bonding between p-aminophenol-formaldehyde polymer and Rose Bengal dye in a method for removing organic dye from wastewater according to the present invention.
Figure 9:
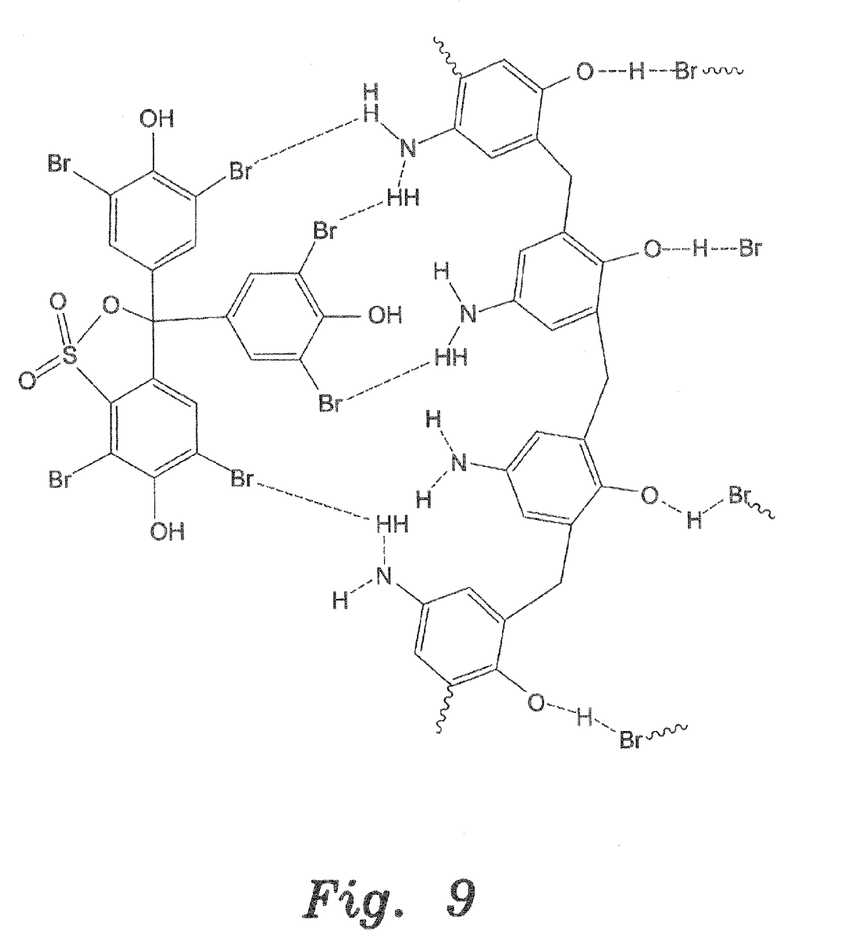
FIG. 9 is a schematic drawing of proposed bonding between p-aminophenol-formaldehyde polymer and bromophenol blue dye in a method for removing organic dye from wastewater according to the present invention.

About 1 gm of $Fe_3O_4$ (ferrite) was dispersed in 25 ml of hexane using an ultrasonic water bath (shown schematically in FIG. 1A), and then 100 ml of pre-polymer was added (shown schematically in FIG. 1B) and homogenized using a mechanical homogenizer at room temperature. The pH of the solution was adjusted to 4.0 using an aqueous solution of HCl, i.e., polymerization was carried out in basic solution. The resulting product was washed and filtered off as $Fe_3O_4$ loaded polymeric microspheres. The FTIR spectrum, thermogravimetric analysis (TGA) curve, and the scanning electron micrograph (SEM) of the resulting magnetic polymer microspheres are reported in FIGS. 3-5, respectively. The SEM in FIG. 5 shows that the microspheres have an average particle size of about 1 μm. FIG. 8 shows a schematic of what the inventors believe is the bonding process between the aminophenol-formaldehyde polymer and the Rose Bengal dye during adsorption of the dye, and FIG. 9 shows a schematic of what the inventors believe is the bonding process between the aminophenol-formaldehyde polymer and the bromophenol blue dye during adsorption of the dye.

Example 4

Adsorption Procedure

Figure 6:
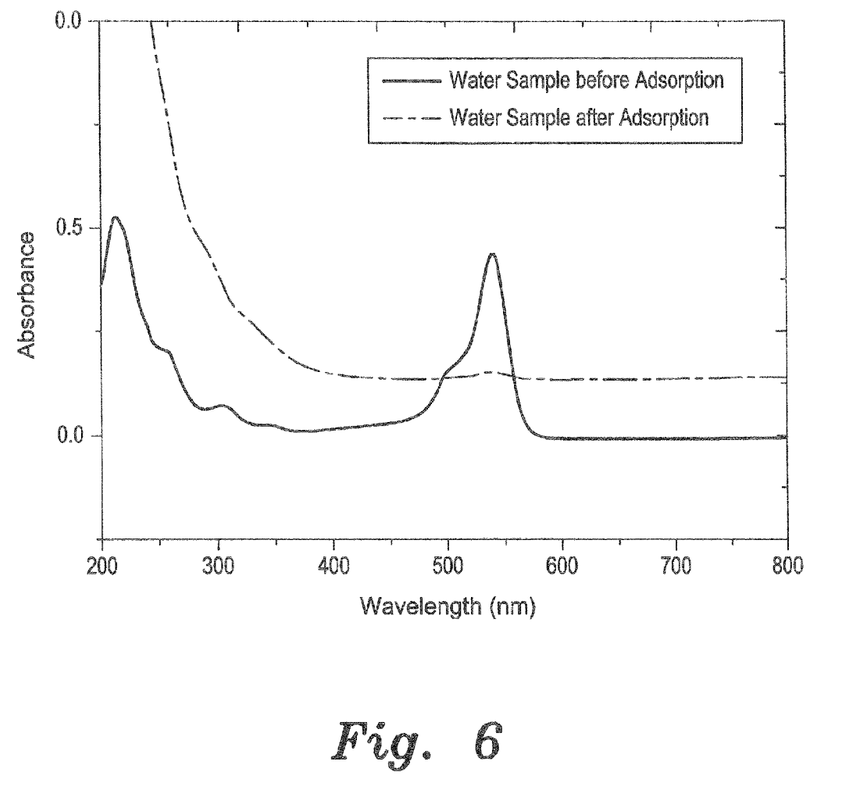
FIG. 6 is the UV-Vis spectrum at 540 nm of Rose Bengal dye in the solution phase before and after adsorption with the magnetic polymer microsphere in used in a method for removing organic dye from wastewater according to the present invention.
Figure 7:
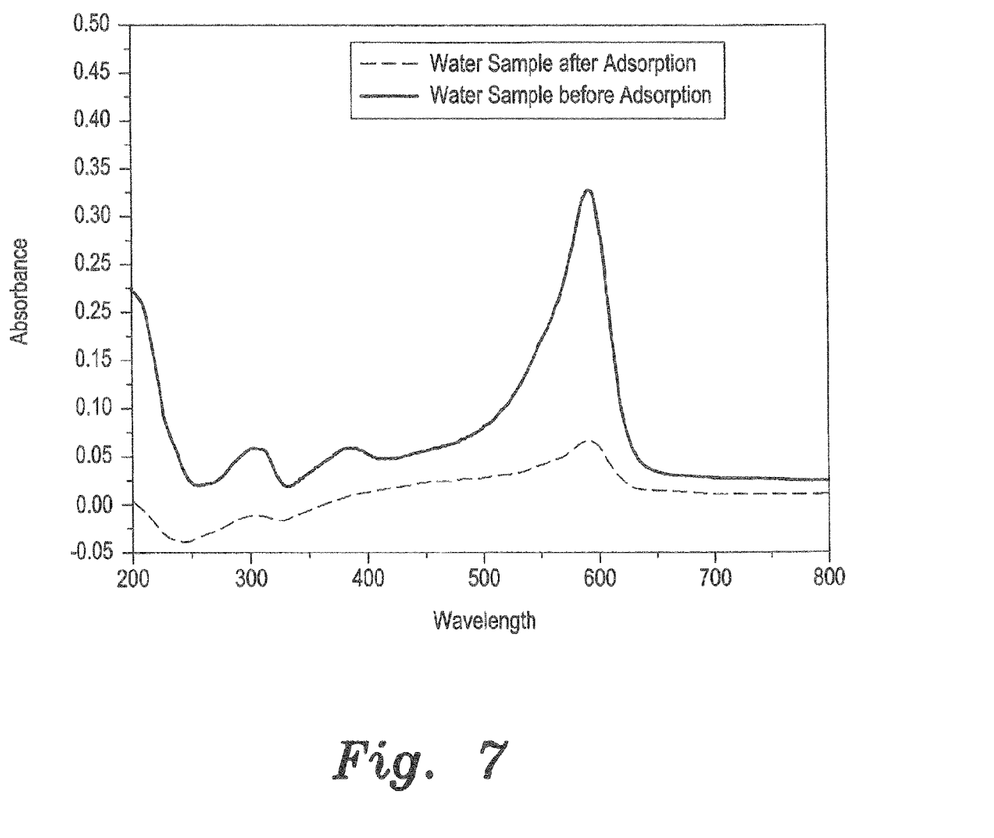
FIG. 7 is the UV-VIS spectrum at 590 nm of bromophenol blue dye in the solution phase before and after adsorption with the magnetic polymer microspheres used in a method for removing organic dye from wastewater according to the present invention.

The adsorption of Rose Bengal dye onto magnetic polymer microspheres was carried out by a batch method. The adsorption trials were carried out in 250 ml glass conical flasks. Initially, about 100 mg magnetic polymer microspheres were added to 40 ml of Rose Bengal (RB) solution of known concentration in a conical flask, which was placed in a thermostatic shaking assembly. The test flasks were sealed to prevent change in volume of the solution during the experiments. The solution was stirred continuously at constant temperature for a certain time to achieve equilibration. After equilibration, the magnetic polymer microspheres were filtered off using a Whatman filter No. 41. The concentrations of Rose Bengal and bromophenol blue in the solution phase before and after adsorption were determined using a double beam UV-Vis spectrophotometer at 540 nm and 590 nm, respectively, as shown in FIGS. 7 and 9. As evident from FIG. 6 and FIG. 7, the absorbance at 540 nm for the Rose Bengal and at 590 nm for the bromophenol blue disappear after adsorption with the magnetic polymer microspheres. A number of parameters (such as contact time, pH, initial RB concentration and temperature) were changed in order to optimize the adsorption process.

The amount of adsorbed dyes at equilibrium, $q_e$ (mg/g), and the percent adsorption (%) of dyes were computed as follows:

$$q_e = \frac{V(C_0 - C_e)}{W \times 1000},$$

where, V is the volume of dyes solution in liters, $C_0$ and $C_e$ are the initial and final concentrations (mg $L^{-1}$) of dyes in solution, respectively, and W is the weight in grams of the magnetic polymer microspheres. The adsorptive capacity, $q_e$, of the magnetic polymer microspheres for Rose Bengal dye was computed to be 11.2 mg/g, and 12.6 mg/g for bromophenol blue dye.

The above examples demonstrate the application of the magnetic polymer microspheres as nano-adsorbents for removing Rose Bengal and bromophenol dyes, respectively. The magnetic polymer microspheres have high surface charge that can remove both Rose Bengal and bromophenol dyes (>99.5%) individually from aqueous solution when the uptake time is at least 5 minutes. The treatment process of removing dyes is clean and sale, as compared to existing methods. In addition, the adsorbed dye can be desorbed using a regenerating solution, comprising methanol. Thus, the magnetic polymer microspheres can be reused as an adsorbent.

Moreover, unexpectedly and remarkably improved water decontamination is achieved using these magnetic polymer microspheres in the presence of a magnetic field, as compared with water decontamination methods employing ordinary ion exchange resins or ferrites taken separately.

It is to be understood that the present invention is not limited to the embodiments described above, but encompasses any and all embodiments within the scope of the following claims.

We claim:

1. A method for removing organic dyes from wastewater, comprising the steps of:
    placing magnetic polymer microspheres into contact with wastewater contaminated with organic dyes, the microspheres having an adsorbent polymer formed around a ferromagnetic core, the adsorbent polymer for adsorbing the organic dyes;
    wherein the polymer comprises 4-aminophenol-formaldehyde and the ferromagnetic core comprises at least one nanoparticle of ferrite ($Fe_3O_4$);
    leaving the microspheres in contact with the wastewater for a sufficient time to permit the organic dyes to adsorb onto the polymer of the magnetic polymer microspheres;
    removing the magnetic polymer microspheres from the wastewater by applying an external magnetic field to the microspheres in the wastewater;
    placing the polymer microspheres in contact with a regenerating solution to regenerate the microspheres;
    separating the regenerated magnetic polymer microspheres from the regenerating solution; and
    recycling the regenerated magnetic polymer microspheres; whereby the regenerated magnetic polymer microspheres are available for continuously removing organic dyes from wastewater.

2. The method for removing organic dyes of claim 1, wherein the regenerating solution comprises methanol.

3. The method for removing organic dyes of claim 1, wherein the step of placing the magnetic polymer microspheres into contact with wastewater contaminated with organic dyes comprises placing the magnetic polymer microspheres into a flowing stream of the wastewater, the method further comprising the step of adjusting the wastewater to have a pH between 7 and 10.

4. The method for removing organic dyes of claim 1, wherein the organic dye is Rose Bengal dye, the magnetic polymer microspheres having an adsorptive capacity of about 11.2 mg/g.

5. The method for removing organic dyes of claim 1, wherein said magnetic polymer microspheres adsorb the organic dyes within less than 5 minutes of contact with the organic dyes.

6. The method for removing organic dyes of claim 1, wherein the magnetic polymer microsphere adsorbs the organic dyes in neutral aqueous solution at a pH of 7.

7. The method for removing organic dyes of claim 1, wherein the organic dye is bromophenol blue dye, the magnetic polymer microspheres having an adsorptive capacity of about 12.6 mg/g.

8. The method for removing organic dyes of claim 1, wherein the polymer is prepared by reacting 4-aminophenol and formaldehyde in basic medium in an organic solvent.

9. The method for removing organic dyes of claim 8, wherein the organic solvent is ethanol.

* * * * *